United States Patent
Goud et al.

(10) Patent No.: US 7,694,298 B2
(45) Date of Patent: Apr. 6, 2010

(54) METHOD AND APPARATUS FOR PROVIDING VIRTUAL SERVER BLADES

(75) Inventors: Gundrala D Goud, Olympia, WA (US); Vincent J. Zimmer, Federal Way, WA (US); Michael A Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1505 days.

(21) Appl. No.: 11/009,891

(22) Filed: Dec. 10, 2004

(65) Prior Publication Data

US 2006/0184349 A1    Aug. 17, 2006

(51) Int. Cl.
  G06F 9/46    (2006.01)
  G06F 9/455   (2006.01)
  G06F 15/173  (2006.01)
  G06F 13/12   (2006.01)

(52) U.S. Cl. .......................... 718/1; 718/104; 709/223; 709/224; 710/62; 710/65; 703/24; 703/27

(58) Field of Classification Search .................. 718/1, 718/100, 101, 102, 103, 104, 105, 106, 107, 718/108; 709/1, 100, 101, 102, 103, 104, 709/105, 106, 107, 108, 223–224; 710/62, 710/65; 703/24, 27
See application file for complete search history.

(56) References Cited

U.S. PATENT DOCUMENTS 5,421,012 A * 5/1995 Khoyi et al. ............... 718/107
6,075,938 A * 6/2000 Bugnion et al. ............ 703/27
7,080,378 B1 * 7/2006 Noland et al. ............. 718/104
7,222,339 B2 * 5/2007 Rothman et al. ........... 717/168
7,313,679 B2 * 12/2007 Ranganathan ............... 713/1
7,376,948 B2   5/2008 Armstrong
7,418,525 B2 * 8/2008 Dalton et al. ............... 710/5
7,496,495 B2 * 2/2009 Solomon et al. ........... 703/26
7,502,729 B2 * 3/2009 Dayar et al. ............... 703/27
7,505,890 B2 * 3/2009 Kuznetsov et al. ......... 703/27
7,543,084 B2 * 6/2009 Arndt et al. ............... 710/8
7,546,386 B2 * 6/2009 Arndt et al. ............... 710/5
7,577,764 B2 * 8/2009 Arndt et al. ............... 710/8

(Continued)

FOREIGN PATENT DOCUMENTS

JP    2004-326774    11/2004

(Continued)

OTHER PUBLICATIONS

PCT/US2005/044703 International Search Report and Written Opinion Mailed Apr. 19, 2006.

(Continued)

*Primary Examiner*—Meng-Ai An
*Assistant Examiner*—Jennifer N To
(74) *Attorney, Agent, or Firm*—D'Ann Naylor Rifai

(57) ABSTRACT

A first virtual machine (VM) in a processing system may emulate a first server blade, and a second VM in the processing system may emulate a second server blade. The emulated server blades may be referred to as virtual server blades. A virtual machine monitor (VMM) in the processing system may provide a communication channel to at least one of the virtual server blades. Other embodiments are described and claimed.

16 Claims, 3 Drawing Sheets

U.S. PATENT DOCUMENTS

| | | | |
|---|---|---|---|
| 7,583,591 B2 * | 9/2009 | Rothman et al. | 370/218 |
| 2002/0016812 A1 * | 2/2002 | Uchishiba et al. | 709/104 |
| 2003/0233385 A1 * | 12/2003 | Srinivasa et al. | 709/1 |
| 2005/0289218 A1 * | 12/2005 | Rothman et al. | 709/203 |
| 2007/0156874 A1 * | 7/2007 | Magro et al. | 709/223 |

FOREIGN PATENT DOCUMENTS

| | | |
|---|---|---|
| WO | 2006/063276 A1 | 6/2006 |

OTHER PUBLICATIONS

The Xen Team: Xen Users' Manual—Aug. 9, 2004, pp. 1-50.

Barham et al—Xen and the Art of Virtualization—ACM SOSP. Proceedings of the ACM Symposium on Operating Sytems Principles, ACM—vol. 37, No. 5—Dec. 2003—pp. 164-177.

Dike: User-Mode Linux Howto—Jun. 18, 2002—p. 1-p. 18.

Dike—User-Mode Linux—Proceedings of Annual Linux Showcase and Conference, Nov. 5, 2001—pp. 1-12.

IPMI—Intel Hewlett Packard NEC Dell— Feb. 12, 2004—Intelligent Platform Management Interface Specification Second Generation—V2.0 Document Revisioin 1.0.

Feb. 18-20, 2003—Enterprise Plateforms Group Intel Corp—Filani et al—Management Solutions for Modular Computing Platforms.

Goldberg—Architecture of Virtual Machines—http://portal.acm.org/citation.cfm?id=803950&coll=Guide&dl=guide&cfid=329594....

Schwaderer—Feb. 2003—Software Corner—Intelligent Platform Management: Critical Key to Future Porducts.

International Preliminary Report on Patentability for Patent Application No. PCT/US2005/044703, mailed Jun. 21, 2007, 8 pages.

Office Action issued from the Japanese Patent Office for Japanese Patent Application No. 2007-545684, dated Dec. 1, 2009.

* cited by examiner

METHOD AND APPARATUS FOR PROVIDING VIRTUAL SERVER BLADES

FIELD OF THE INVENTION

The present disclosure relates generally to the field of data processing, and more particularly to the emulation of computer hardware.

BACKGROUND

Server blades, also known as blade servers, are data processing systems that are built on cards and that plug into slots in a rack, also known as a chassis. For example, a chassis may feature numerous vertical slots, and multiple server blades for handling application workloads may be plugged into those slots like books on a bookshelf. Server blades may therefore be referred to as modular computing components or platforms. International Business Machines (IBM) Corporation, for example, sells a line of server blades under the BladeCenter trademark. Such a server blade may use two processors, such as the processors referred to by Intel Corporation as Xeon processors. Other types of server blades may use different types and numbers of processors.

The chassis may contain a backplane and/or an interconnect module with buses or communication lines interconnecting the slots in the rack. In addition, a chassis management module (CMM) may be plugged into the rack, for monitoring the resources within the chassis, for providing management warning or alerts, for receiving management directives, and for performing other administrative functions associated with the server blades. The chassis may also contain many other types of components or modules, such as shared power modules, storage blades containing hard disk drives, input/output (I/O) blades for optical or other types of I/O, etc. For purposes of this disclosure, the term server blade includes I/O blades and similar modules.

Server blades are typically small, and it is typically relatively easy to install additional server blades into a chassis. Server blades therefore typically provide better density and scalability than standalone servers. Consequently, a significant amount of software has been developed to provision, configure, manage, and support such modular, scalable components, including software for remotely managing the hardware, and software for apportioning different sets of blades for use by different software applications. For instance, the management software may group multiple server blades together to cooperate in handling the processing workload of a software application such as a web server, for example. Thus, multiple blades may operate more or less as a virtual unified processing system.

The software for apportioning blades for different applications may also provide for automatic reapportionment in response to changing conditions. For example, blades may be reapportioned in response to changes in the workload being handled by one or more applications, or in response to hardware or software errors in one or more blades. In some instances, blades and chassis may include hardware and/or software to support autonomous monitoring and recovery features, in accordance with a specification such as the Intelligent Platform Management Interface (IPMI) Specification, Second Generation, v2.0, Revision 1.0, dated Feb. 12, 2004.

A different approach to data processing is to partition a single platform or server into multiple virtual machines, with an independent operating system (OS) and independent software applications running in each virtual machine. For instance, a company named VMWare provides software that supports partitioning a single physical processing system into multiple virtual machines. The software provided under the name Connectix Virtual PC by Microsoft Corporations also supports partitioning a single platform into multiple virtual machines.

BRIEF DESCRIPTION OF THE DRAWINGS

The features and advantages of the present invention will become apparent from the appended claims and the following detailed description of one or more example embodiments, in which:

DETAILED DESCRIPTION

Figure 1:
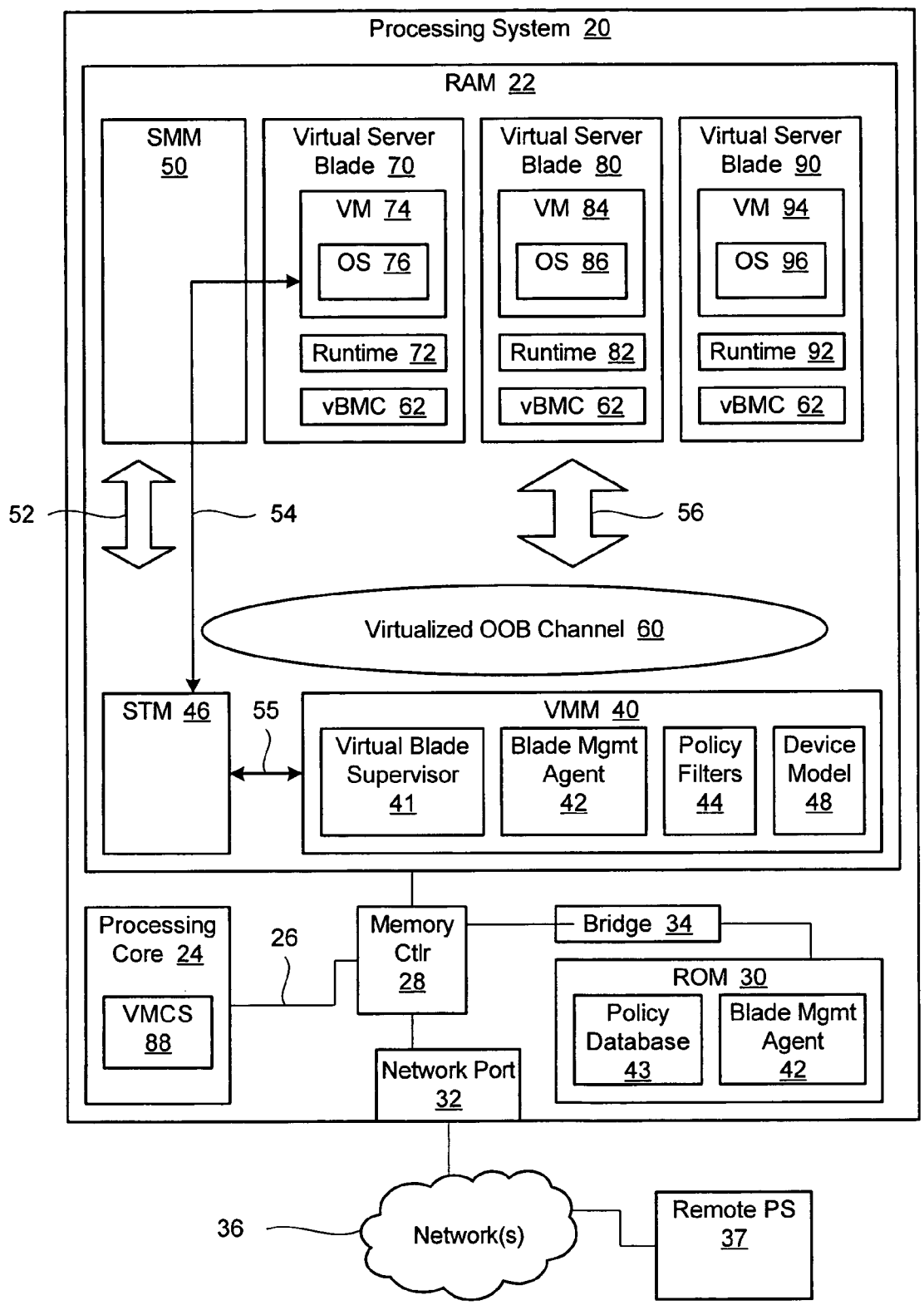
FIG. 1 is a block diagram depicting hardware and software in a suitable data processing environment to include virtual server blades in accordance with an example embodiment of the present invention.

FIG. 1 is a block diagram depicting example hardware and software components in an example data processing environment to include virtual server blades 70, 80, and 90, according to an example embodiment of the present invention. FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, minicomputers, client-server systems, personal computers, workstations, servers, portable computers, laptop computers, tablet processing systems, telephones, personal digital assistants (PDAs), handheld devices, mobile handsets, entertainment devices such as audio and/or video devices, and other devices for processing or transmitting information.

The data processing environment of FIG. 1, may include a processing system 20 that includes one or more processors or central processing units (CPUs) 24 communicatively coupled to various other components via one or more buses or other communication conduits or pathways. Processor 24 may be implemented as an integrated circuit (IC) with one or more processing cores. In one embodiment, one or more Intel® Xeon™ processors may be used for processor 24. Processor 24 may support processor virtualization. In other embodiments, other processors may be used, including processors from other manufacturers. The components coupled to processor 24 may include one or more volatile or non-volatile data storage devices, such as random access memory (RAM) 22 and read-only memory (ROM) 30. One or more buses 26 may serve to couple RAM 22 and ROM 30 with processor 24, possibly via one or more intermediate components, such as a memory controller 28, a bus bridge 34, etc. For purposes of this disclosure, the term "ROM" refers in general to non-volatile memory devices such as erasable programmable ROM (EPROM), electrically erasable programmable ROM (EEPROM), flash ROM, flash memory, non-volatile RAM (NV-RAM), etc.

Processor 24 may also be communicatively coupled to mass storage devices, such as one or more integrated drive electronics (IDE) drives, small computer systems interface (SCSI) drives, or other types of hard disk drives. Other types of mass storage devices and storage media that may be used by processing system 20 may include floppy-disks, optical storage, tapes, memory sticks, digital video disks, biological storage, etc.

Additional components may be communicatively coupled to processor 24 in processing system 20, including, for example one or more of each of the following: video, SCSI, network, universal serial bus (USB), keyboard, and other types of device controllers; input/output (I/O) devices; network ports 32; and other I/O ports. Such components may be connected directly or indirectly to processor 24, for example via one or more buses and bus bridges. In some embodiments, one or more components of processing system 20 may be implemented as embedded devices, using components such as programmable or non-programmable logic devices or arrays, application-specific integrated circuits (ASICs), embedded computers, smart cards, and the like.

Processing system 20 may be controlled, at least in part, by input from conventional input devices, such as a keyboard or keypad, a pointing device, etc., and/or by directives received from one or more remote data processing systems 38, interaction with a virtual reality environment, biometric feedback, or other input sources or signals. Processing system 20 may send output to components such as a display device, remote data processing system 38, etc. Communications with remote data processing system 38 may travel through any suitable communications medium. For example, processing systems 20 and 37 may be interconnected by way of one or more physical or logical networks 36, such as a local area network (LAN), a wide area network (WAN), an intranet, the Internet, a public switched telephone network (PSTN), a cellular telephone network, etc. Communications involving network 36 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which, when accessed by a machine, result in the machine performing tasks or defining abstract data types or low-level hardware contexts. Such data may be referred to in general as software, and it may be stored in volatile and/or non-volatile data storage.

For example, one or more storage devices accessible to or residing within processing system 20, such as ROM 30, may include some or all of a software application which, when executed by processor 24, creates and supports one or more virtual server blades within processing system 20. As described below, such a software application may be implemented partially or completely within a virtual machine monitor (VMM) 40. For instance, code to implement a virtual blade supervisor 41 and a blade management agent 42 may be loaded from ROM 30 into RAM 22 and executed by processing core 24 to provision and manage virtual server blades 70, 80, and 90. Virtual blade supervisor 41 and blade management agent 42 may be loaded and executed in conjunction with the loading and execution of VMM 40, for example as part of a boot process.

In addition, virtual blade supervisor 41 may define and utilize various policy filters 44 to guide the provisioning and management of virtual server blades 70, 80, and 90. Some or all of those policy filters 44 may be based at least in part on entries stored in a policy database 43. For example, policy database 43 may include entries that specify how many virtual server blades are to be created, what type of firmware environment is to be loaded into each virtual server blade, what type of OS is to be loaded into each virtual server blade, how much memory is to be made available to each blade, which network channels or other I/O channels are to be made available to each blade, how much bandwidth of a given I/O channel is to be made available to each blade, how much disk storage is to be made available to each blade, how much compute time or what portion of aggregate compute time is to be made available to each blade, etc. As described in greater detail below, virtual blade supervisor 41 may provision and manage virtual server blades 70, 80, and 90 according to the policies stored in policy database 43.

In the example embodiment, virtual blade supervisor 41 provisions or creates virtual server blades 70, 80, and 90, and virtual blade supervisor 41 provides each virtual server blade with its own independent firmware environment 72, 82, and 92, respectively. For purposes of this disclosure, virtual server blades may also be referred to as emulated server blades, and firmware environments may also be referred to as runtime environments. Within each emulated server blade, the runtime environment may provide low level services such as the services typically provided by a basic input/output system (BIOS) in a conventional data processing system.

Virtual blade supervisor 41 may provide one or more virtual server blades with different runtime environments. For example, in virtual server blade 70, runtime environment 72 may provide interfaces to hardware and other services in accordance with a modular firmware architecture that complies with the Extensible Firmware Interface (EFI) specification. Runtime environment 72 may therefore also be referred to as an EFI runtime. Runtime environment 92 may also be an EFI runtime. Version 1.10, update 001, of the EFI specification, dated Nov. 26, 2003, may be obtained from the URL www-intel-com/technology/efi/main_specification.htm#update (where the URL has been modified to replace the character '.' with character '-' to avoid an active hyperlink from this document). Runtime environment 82 may be a legacy runtime, such as the firmware environment provided by a conventional, relatively monolithic BIOS.

In addition, VMM 40 provides each of virtual server blades 70, 80, and 90 with its own respective virtual machine (VM) 74, 84, and 94. Each VM may include its own independent OS, and the OS can vary from VM to VM. For example, OS 76 in virtual server blade 70 may be a WINDOWS Server OS, OS 86 in virtual server blade 80 may be a SOLARIS OS, and OS 96 in virtual server blade 90 may be a LINUX OS. In alternative embodiments, other types of runtime environments and OSs may be used.

As indicated by block arrow 56, VMM 40 may provide processor, platform, and blade rack virtualization for virtual server blades 70, 80, and 90. For example, VMM 40 may provide each virtual server blade with the illusion that the runtime environment and the OS in that virtual server blade are the only runtime environment and OS running in processing system 20. Each virtual server blade may therefore operate as an independent entity. The way VMM 40 interacts with each virtual server blade may establish such independence. For example, VMM 40 may provision and manage memory and I/O usage for each virtual blade in a way that maintains the independence of each virtual blade. VMM 40 may thus allows the OS and runtime environment in each virtual server blade to operate as if that OS and runtime environment were the only OS and runtime environment running in processing system 20. VMM 40 may also protect and isolate each virtual server blade from the other virtual server blades. For example, a software virus in one virtual server blade may be limited that virtual server blade, so the virus would not effect the operation of the other virtual server blades.

One of the mechanisms that processing system 20 may use to create and manage virtual server blades is a mode of operation known as system management mode (SMM) 50. Processing system 20 may automatically enter SMM 50 in response to a system management interrupt (SMI). The current system state may be automatically saved when SMM 50 is entered, and automatically restored when SMM 50 is exited. When in SMM 50, processing system 20 may perform operations independently of any OS in processing system 20. The hardware and software support for SMM 50 may be included in processing system 20 when the customer receives processing system 20 from the manufacturer or vendor. SMM 50 may therefore be referred to as an original equipment manufacturer (OEM) SMM.

In one embodiment, VMM 40 uses a hardware data structure known as a virtual machine configuration structure (VMCS) 88 within processor 24 to manage the state of each virtual blade. VMCS 88 may share some similarities with a conventional task state segment (TSS). For instance, processor 24 may decode VMCS 88. In one embodiment, VMM 40 uses VMCS 88 to manage the I/O and memory resources for each virtual blade.

VMM 40 may use a software entity known as a virtual translation lookaside buffer (TLB) to provide another layer of memory mapping, from the mapping of guest VMs 74, 84, and 94. For instance, the virtual TLB may use page tables map memory references received from virtual server blades 70, 80, and 90 into corresponding physical addresses in RAM 22.

VMM 40 may also include device models that emulate controllers and devices. For instance, VMM 40 may include a device model for emulating a programmable interrupt controller (PIC), an advanced programmable interrupt controller (APIC), an I/O APIC, etc.; another device model for emulating an integrated drive electronics (IDE) controller; another device model for emulating a network controller; etc. Emulated devices and controllers based on device models may also be referred to as virtual controllers and devices. VMM 40 may use device models to provide virtual controllers and devices which allocate resources and govern resource usage for each virtual blade, in accordance with the policy settings.

For instance, in the example embodiment, VMM 40 may use a baseboard management controller (BMC) device model 48 to provide an emulated BMC 62 for each virtual blade. An emulated BMC may also be referred to as a virtual BMC or vBMC. Each virtual BMC 62 may provide the functionality that a conventional BMC may provide for a physical server blade. For instance, virtual BMCs 62 may log event and error data, and virtual BMCs 62 may report status data to software within processing system 20 and/or to external management software. The status data may include information such as error reports and current operational for the emulated server blade associated with the emulated BMC.

In one embodiment, the virtual BMC 62 for each virtual server blade may trap the I/O ports of a keyboard controller style (KCS) interface of that virtual server blade, and redirect the I/O to the BMC device 48 model in VMM 40. In the example embodiment, BMC device model 48 represents a class of software in VMM 40 that maps VM-visible I/O operations into veritable H/W operations. In addition, BMC device model 48 may materialize a virtual BMC 62 for each VM 70, 80, and 90; and BMC device model 48 may either communicate with a physical BMC with processing system 20 or effect BMC-like behavior in some other fashion.

VMM 40 may also provide a virtual out-of-band channel 60 for communications to, from, and between virtual server blades 70, 80, and 90. From the perspectives of the software in each virtual blade servers and of blade management software outside the virtual blades, such virtual out-of-band channels may be indistinguishable from the out-of-band (OOB) channels provided in server blade racks for conventional server blades.

In addition to using I/O emulation to effect device models, VMM 40 may provide processing system 20 with blade VM's which know that they are being virtualized. Such virtual machines may be referred to as enlightened guests, or as para-virtualized machines. Instead of accessing an I/O port which is trapped and/or emulated in VMM 40, a virtual blade using a para-virtualized machine may make a synchronous call into VMM 40 through an instruction such as the IA32 virtual machine call (VMCALL) instruction.

Portions of VMM 40, such as blade management agent 42, may also provide robust capabilities for monitoring and managing virtual server blades 70, 80, and 90. For instance, blade management agent 42 may provide some or all of the functionality that would be provided by a conventional CMM in a rack with physical server blades, such as an external interface for communication with external devices; internal interfaces for communication with virtual server blades 70, 80, and 90; support for mirroring of virtual blades; support for automatic fail-over between virtual blades in response to errors such as soft errors; etc. In some embodiments, these and other types of managerial or administrative functions may be performed primarily by blade management agent 42 or other software within VMM 40, based on policies represented by policy definitions stored in policy filters 44. For purposes of this disclosure, software that provides some or all of the functionality that a conventional CMM provides may be referred to as a virtual CMM. In one embodiment, blade management agent 42 constitutes a virtual CMM.

In some embodiments, portions of VMM 40 such virtual blade supervisor 41 and/or blade management agent 42 may serve as an interface to virtual server blades 70, 80, and 90 for conventional software for managing physical blades, such as the client/server workgroup management software distributed by IBM Corporation under the name IBM Director. Processing system 20 may thus leverage the software, system, and network infrastructure developed by the industry to support physical blades, for use in the context of a single physical platform that uses hardware virtualization to emulate multiple server blades. A data center administrator may therefore view the single physical platform of processing system 20 as a pool of physically-isolated, independently manageable server blades. Accordingly, VMM 40 may allow virtual server blades 70, 80, and 90 to be individually repurposed, leased, and/or used by different tenants.

In various embodiments, the functionalities referenced above may be supported by VMM 40 and managed by blade management agent 42 within VMM 40, by conventional blade management software running within processing system 20, or by conventional blade management software running on an external system such as remote processing system 37. In other embodiments, the management functionality may be distributed among blade management agent 42 and internal or external blade management software.

Figure 2:
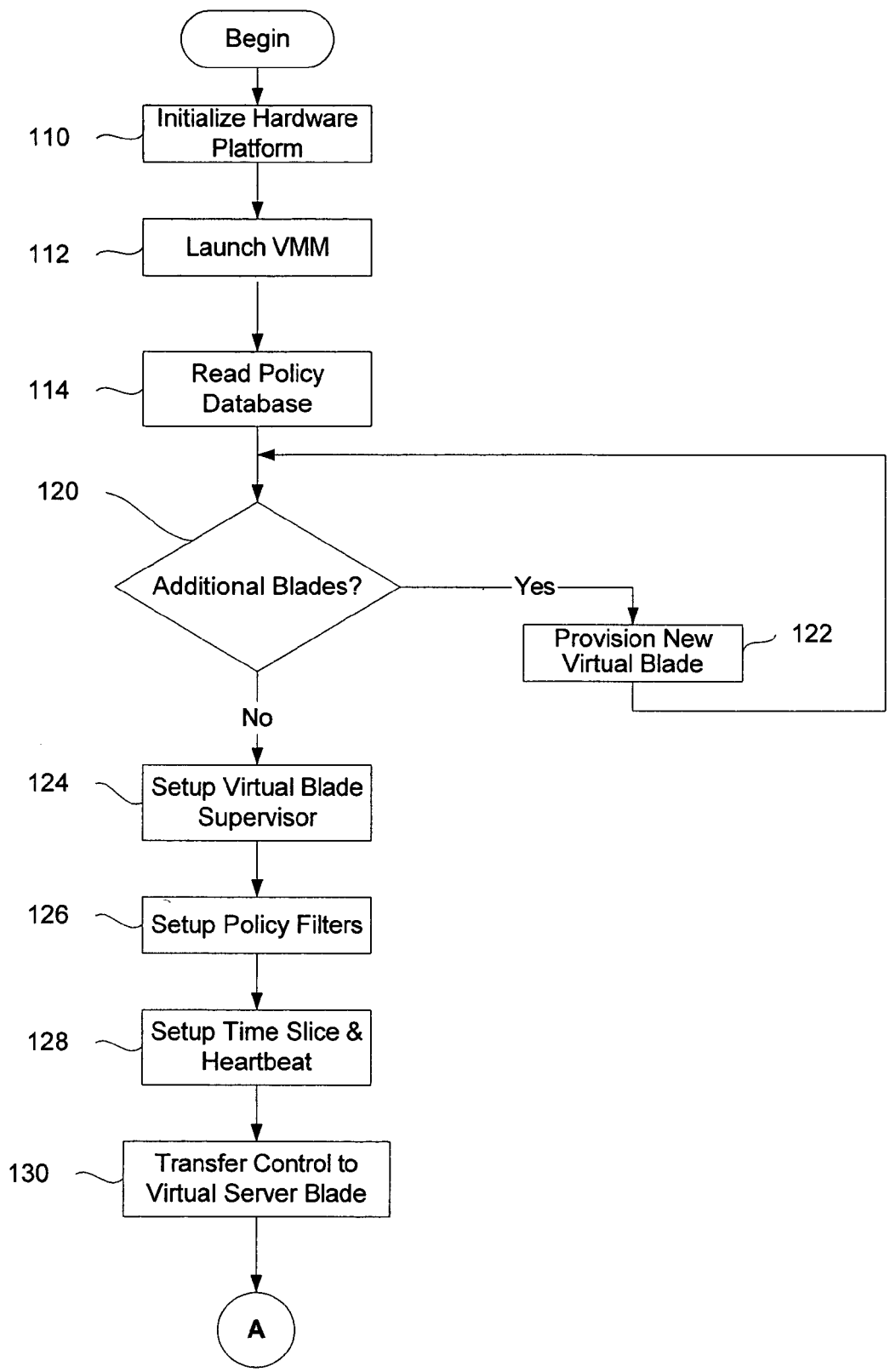
FIGS. 2 and 3 provide a flowchart of a process for providing virtual server blades, in accordance with an example embodiment of the present invention.
Figure 3:
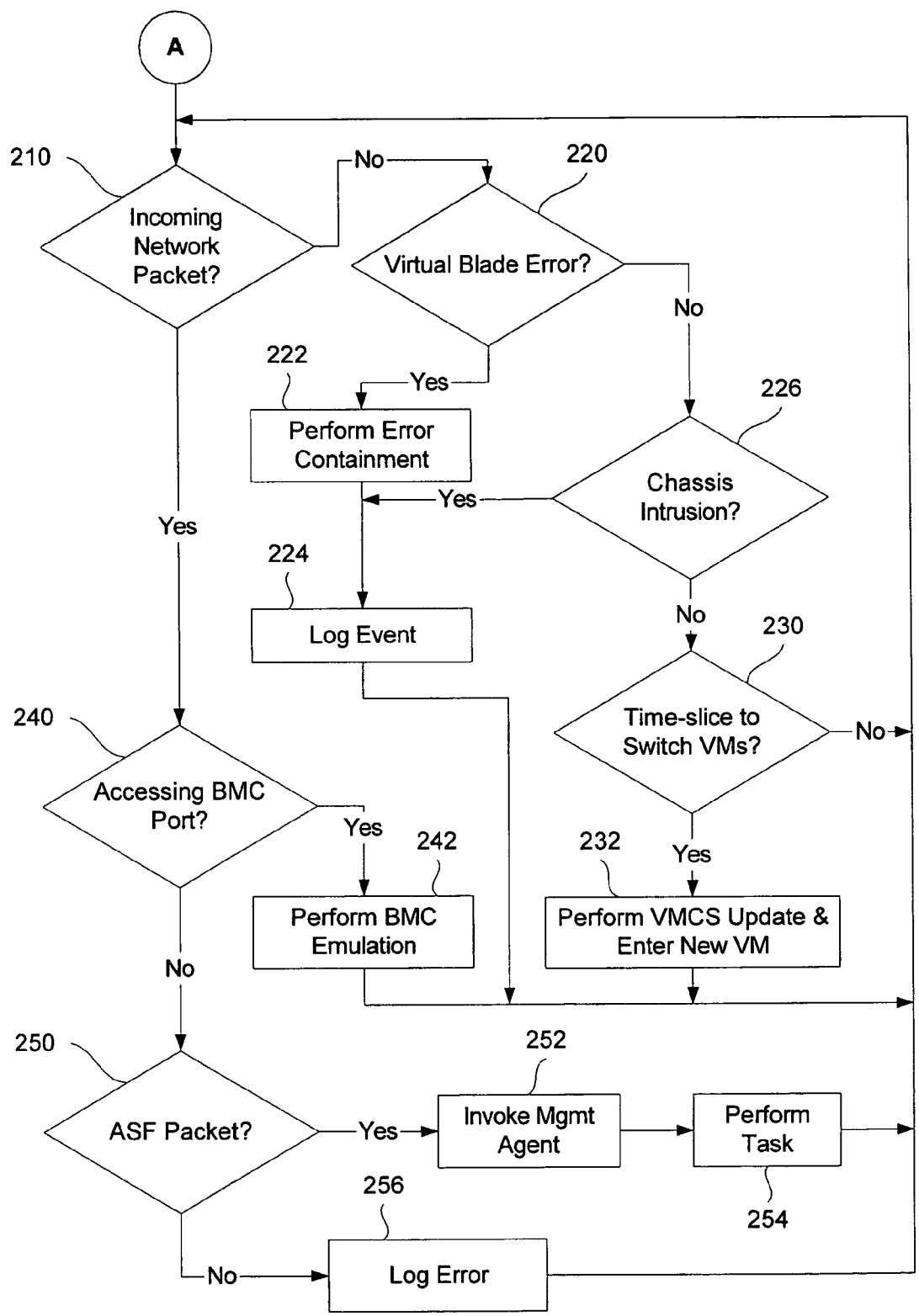

FIGS. 2 and 3, taken together, provide a flowchart of a process for providing virtual server blades, in accordance with an example embodiment of the present invention. The illustrated process may begin with processing system 20 initiating a boot sequence, for instance in response to a power on or reset event. At block 110, some or all of the hardware in processing system 20 may be initialized. For instance, components such as processor 24, RAM 22, a chipset, an I/O controller, etc. may be initialized. Then, at block 120, VMM 40 may be obtained from a local or remote data store, loaded into RAM 22, and launched. At block 114, VMM 40 may read policy database 43 to obtain configuration parameters for provisioning and managing virtual server blades. In other embodiments, VMM 40 may obtain the configuration parameters from a remote source, such as a remote management console. VMM 40 may then provision any virtual server blade instances called for by the configuration parameters, as indicated at block 120 and 122. For example, virtual blade supervisor 41 may instantiate and configure virtual server blades 70, 80, and 90 in accordance with data from policy database 43, as indicated above.

Once the initial set of virtual server blades has been instantiated, VMM 40 may launch virtual blade supervisor 41, as indicated at block 124. As depicted at block 126, virtual blade supervisor 41 may set up policy filters 44 to be used in managing virtual server blades 70, 80, and 90, based at least in part on least in part on the configuration parameters from policy database 43. Policy filter 44 may control such things as failover parameters; packet handling instructions; error handling instructions; which attributes of virtual blades 70, 80, and 90 will be made visible to server management software; heartbeat and time slice durations; etc. In one embodiment, the policy parameters in policy filter 44 correspond to the policies that a CMM would implement or enforce in a system with physical server blades.

As indicated at block 128, virtual blade supervisor 41 may then establish one or more time periods to limit the amount of time that each virtual server blade runs before control is passed to another virtual blade server. Such a predetermined time period may also be referred to as a time slice. In addition, virtual blade supervisor 41 may establish a shorter time period to limit the amount of time that any virtual server blade runs before control is passed back to VMM 40. That time period may be referred to as a heartbeat.

VMM 40 may then pass control to one of the virtual blades, as indicated at block 130. The process may then pass through page connector A to block 210.

In the example embodiment, control may return to VMM 40 upon an exit from any of the virtual blades caused by expiration of a time slice or heartbeat. Certain types of input, such as incoming network packets, may also cause control to return to VMM 40. When VMM 40 gets control, it may perform tasks such as house keeping operations, and may then pass control to a successive virtual blade. In the example embodiment, VMM 40 typically consumes less than ten percent of the total compute time, and virtual blades 70, 80, and 90 get most of the compute time.

Referring again to FIG. 1, another mechanism that processing system 20 may use to support virtual server blades 70, 80, and 90 is a software element known as an SMI transfer monitor (STM) 46. In the example embodiment, STM 46 is a parallel, peer monitor to VMM 40, and STM 46 is responsible for guest-hosting the SMM code in its own VM as indicated at SMM 50. The same organization may develop STM 46 and VMM 40, or they may be developed by different entities.

STM 46 may also create an STM-SMM interface 52 in processing system 20. When SMM 50 wants to touch a resource that is not virtualized, such as a physical memory address in a secure system with curtained memory, STM 46 may use STM-SMM interface 52 to request that STM 46 performs the access. For example, SMM 50 may use STM-SMM interface 52 for functions like soft error correction code (ECC) scrubbing. In the example embodiment, exit events from SMM 50 go into STM 46. Any suitable memory and messaging interfaces may be used between STM 46 and VMM 40.

In FIG. 1, line 54 represents an application program interface (API) between the OEM SMM code and STM 46 and/or VMM 40. This API allows isolation of CMM-specific data and other virtualization information from OEM code. This interface allows a business deployment where the OEM SMM code and the STM code can have different authors, for instance. Line 54 can connect to any of virtual machines 74, 84, and 94, as each guest can be exited via an SMI activation.

Line 55 represents an interface to abstract the peer monitor (STM 46) from the main monitor (VMM 40). This abstraction allows a similarly split deployment model where the author of STM 46 could differ from the author of VMM 40.

Referring again to FIG. 3, at block 210, virtual blade supervisor 41 may determine whether processing system 20 has received a network packet. If no network packet has been received, virtual blade supervisor 41 may determine whether any of virtual server blades 70, 80, and 90 has experienced an error, as indicated at block 220. For example, if there is a memory error in the physical memory array, processing system 20 may map the BERR# (bit error rate) or BINIT# (bus initialize) signal to a system management interrupt number (SMI#). In response to the SMI, if the memory error resides in a portion of memory associated with a virtual server blade, SMM 50 may attempt to communicate, via the KCS interface, with the virtual BMC 62 of that virtual server blade. This communication may involve a virtual machine exit (VMEXIT) from the guest-hosted SMM 50 into STM 46. Thus, as indicted at block 222, SMM 50 may perform error containment for the error.

For instance, in the event of an error contained within a given VM, such as a double ECC failure in a physical memory page, VMM 40 can either map a different physical page to that VM if the contents of memory are recoverable, or terminate the VM and permanently mark the failed memory region as unusable. The types of errors that virtual BMC 62 may handle include, without limitation, single- and double-bit memory errors, overheating, etc.

Processing system 20 may then log the error, as indicated at block 224. For example, when a memory error occurs as described above, virtual BMC 62 may log the memory page and the event of failure. To log the error, STM 46 may send a message to VMM 40 that there is an error log to be posted by a virtual BMC 62. This message may be passed, for instance, via a mailbox or other predetermined region in a portion of memory that is shared by VMM 40 and STM 46. A BMC device model in VMM 40 may then store the error information, for example to a portion of the hard-disk reserved by VMM 40 for storing virtual blade error conditions.

Referring again to block 220, if no virtual server blade error has been detected, virtual blade supervisor 41 may determine whether intrusion into the chassis of processing system 20 has been detected, as indicated at block 226. If intrusion has been detected, virtual blade supervisor 41 may log the intrusion, as indicated at block 224. After any intrusion or any virtual server blade errors have been logged, the process may then return to block 210, with virtual blade supervisor 41 determining at the next heartbeat whether processing system 20 has received a network packet.

However, if no chassis intrusion has been detected, virtual blade supervisor 41 may determine whether the time slice for a current virtual server blade has expired, as indicated at block 230. If the time slice for the current blade has expired, virtual blade supervisor 41 may swap control from the current virtual server blade to the next virtual server blade, as indicated at block 232. For instance, virtual blade supervisor 41 may perform an update of a pointer in VMCS 88 from a current virtual blade state in VMCS 88 to a successor virtual blade state in VMCS 88. Such a VMCS update may cause VMCS 88 to point to the memory and I/O state of the VM for the desired successor virtual blade. Performing such an update may be similar to updating an IA32 TSS in preparation for performing a task switch. After the VMCS update, VMM 40 may perform a virtual machine enter (VMEnter) command to pass control to the VM of that successor virtual blade.

At the next heartbeat after either swapping in the desired virtual blade server or determining that the time slice has not expired, the process may return again to block 210, with virtual blade supervisor 41 determining whether processing system 20 has received a network packet.

At block 210, if processing system 20 has received a network packet, virtual blade supervisor 41 may determine whether that packet is addressed to the network port of the virtual BMC 62 of one of the virtual server blades, as indicated at block 240. If the packet is addressed to a virtual BMC port, VMM 40 may perform BMC emulation, as indicated at block 242. For example, blade management agent 42 may perform BMC emulation by providing an I/O trap on the KCS interface, for instance by trapping a particular address/data port. Also, blade management agent 42 may provide an instance of a virtual BMC for each virtual machine. The VMM device model may moderate KCS interface accesses from multiple VM agents such that each VM thinks it has sole access. Similarly, each VM may appear to have its own system event log (SEL), and its own Internet Protocol (IP) address. Any appropriate device emulation techniques may be used to achieve these ends.

However, if the packet is not addressed to a virtual BMC port, blade management agent 42 may determine at block 250 whether the packet contains data pertaining to remote system management. For instance, virtual blade supervisor 41 may determine whether the packet comports with a specification for remote control and alerting interfaces, such as the alert standard format (ASF) specification. Version 2.0 of the ASF specification, dated Apr. 23, 2003, may be obtained from www.dmtf.org/standards/asf. For purposes of this disclosure, packets containing data for remote system management may be referred to in general as ASF packets. In one embodiment, remote system 37 may use an application such as IBM DIRECTOR to send packets with data for remote system management to processing system 20. If the received packet is not an ASF packet, virtual blade supervisor 41 may log an error indicating that the packet could not be processed, as indicated at block 254.

If the packet is an ASF packet, virtual blade supervisor may invoke blade management agent 42, as indicated at block 252. Conventionally, ASF functionality is typically provided by a network interface card (NIC). VMM 40 may use a network device model to emulate the NIC and provide ASF packet processing. For instance, blade management agent 42 may process the packet and perform any operations called for by the packet, as indicated at block 254. For example, the packet may cause blade management agent 42 to repurpose and/or reconfigure one or more virtual server blades. For instance, blade management agent 42 may allow remote system 37 to obtain configuration and error data from one or more virtual server blades; to add or remove one or more virtual server blades; to change the amount of memory, disk space, and/or I/O bandwidth available to one or more virtual server blades; to reallocate processing workload among virtual server blades 70, 80, and 90; etc. Blade management agent 42 may perform such operations via virtual BMCs 62 of the relevant virtual server blades.

After blade management agent 42 has performed the operations called for by the packet, or after an error has been logged for a non-ASF packet, the process may return to block 210. Processing system may then continue to support and manage virtual server blades, repeating the above operations, as appropriate. The technology described herein may thus provide a seamless manageability infrastructure underneath virtual server blades 70, 80, and 90.

In the example embodiment, a separate physical network port or media access control (MAC) address may be assigned or directly mapped to each virtual server blade that is to have networking capabilities at the OS or application level. However, in alternative embodiments, VMM 40 may use a single port, such as network port 32, to emulate multiple independent ports for multiple virtual sever blades. Such an embodiment may use a process like that summarized in FIG. 3. However, the system may also determine whether an incoming packet is destined for an OS or application in one of the virtual blades and then forward the packet accordingly, for example between the operations depicted at blocks 210 and 240.

As has been described, processing system 20 may use virtual machine technology to provide multiple virtual instances of server blades, to provide a virtual communication channel for those virtual server blades, and to support management of the virtual server blades. In some embodiments, the modular computing devices that that are emulated by the VMM may include processing blade devices and I/O blade devices.

Hardware capabilities are expected to increase in the future. For instance, the number of cores on a processor may be increased. The teachings of the present disclosure may be used to retrofit conventional server management infrastructure for managing the enhanced capabilities to be provided by future processing system. The teachings of the present disclosure may also be used for provisioning and managing grid computing technologies, for example to provide for software based demand computing.

Using techniques and components such as those described herein, software based blades such as virtual server blades 70, 80, and 90 may be used for teaming and fail over design, and can achieve high reliability, availability, and scalability (RAS). For instance, blade management agent 42 and virtual blade supervisor 41 may automatically modify operational parameters of emulated server blades, in response to data received from the emulated BMC. For example, if data from an emulated BMC indicates that an application in the corresponding virtual blade has malfunctioned or hung, blade management agent 42 and virtual blade supervisor 41 may automatically replace the malfunctioning virtual blade with a different virtual blade. The replacement virtual blade made be an existing virtual blade, or processing system 20 may automatically provision a new virtual blade for use as the failover blade. Blade management agent 42 and virtual blade supervisor 41 may perform such operations based at least in part on predetermined policies for blade management stored in a database of blade management policies, such as policy filters 44 and/or policy database 43.

Blade management agent 42 and/or virtual blade supervisor 41 may automatically make other kinds of modifications to the operational parameters of emulated server blades 70, 80, and 90 in response to other types of conditions. For example, VMM 40 may provide for automatically load balancing and other types of automatic adjustments in response to other kinds of conditions detected by virtual BMCs 62, and VMM 40 may allow manual or automatically adjustments to be made from local or remote blade management software packages. For example, VMM 40 may accomplish the equivalent of a hot add of memory by shifting memory allocation to one VM to from another, and the equivalent of a hot add of disk space by shifting virtual disk to one VM from another. Similar adjustments can be made with regard to network band-width, etc.

The technology described herein may be used in cooperation with existing technology to provide fail-safe mechanisms via software. For instance, enterprise blade capabilities may be provided in a single box. Customers with large investments in conventional server blade infrastructure can be used that infrastructure to manage the VMM-based virtual blades described herein. A processing system with virtual server blades may provide higher processing performance (e.g., millions of instructions per second (MIPS)) per unit of energy (e.g., Watt) and space consumed (e.g., centimeter ($cm^3$)), relative to other types of systems.

In one embodiment, processing system 20 provides a logical view of virtual server blades so that different tenants can enjoy strong isolation properties and accrue advantages of the blade manageability infrastructure. The users may therefore enjoy reduced product bill of material (BOM) costs, relative to a processing system with a blade chassis and physical server blades, while still enjoying many of the benefits of blade architecture based servers. For instance, the BOM for a processing system with physical server blades may include redundant server management hardware, cooling components, etc.

In some embodiments, the support for hardware virtualization may be provided by the processor or platform developer. With such embodiments, customers may deploy virtual server blades without the need for any virtualization software from third party software developers.

In light of the principles and example embodiments described and illustrated herein, it will be recognized that the illustrated embodiments can be modified in arrangement and detail without departing from such principles. For instance, the present invention is not limited to utilization in the example embodiments described herein, but may also be used to advantage in many other types of systems. In addition, although the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to the processes could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, DVDs, ROM, and RAM; as well as communications media such as antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope and spirit of the following claims and all equivalents to such implementations.

What is claimed is:

1. A method comprising:

using a first virtual machine (VM) in a processing system to emulate a first server blade;

using a second VM in the processing system to emulate a second server blade; and using a virtual machine monitor (VMM) in the processing system to provide a communication channel to at least one of the emulated server blades to emulate an out-of-band communication channel for at least one of the emulated server blades;

using the VMM to emulate a baseboard management controller (BMC) for at least one of the emulated server blades;

receiving status data from one of the emulated BMCs via the emulated out-of-band communication channel, wherein the status data pertains to an operational status of the emulated server blade associated with the emulated BMC;

sending the status data from the VMM to server blade management software, wherein the server blade management software includes control logic to allow workload to be reallocated among physical server blades, but the server blade management software lacks support for reallocating workload among virtual server blades;

receiving, from the server blade management software, a packet requesting reallocation of workload from the first emulated server blade to the second emulated server blade; and in response to receiving the packet, using the emulated BMCs of the first and second emulated server blades to reallocated workload from the first VM to the second VM.

2. A method according to claim 1, further comprising:

executing a virtual blade supervisor within the VMM, the virtual blade supervisor to manage the emulated server blades.

3. A method according to claim 1, further comprising:

receiving, at the VMM, data pertaining to an operational status of one of the emulated server blades; and forwarding the data pertaining to the operational status of the emulated server blade from the VMM to a remote data processing system.

4. A method according to claim 1, further comprising:
using the VMM to emulate a chassis management module (CMM) to manage the emulated server blades.

5. A method according to claim 1, further comprising:
automatically modifying an operational parameter of one or more of the emulated server blades, in response to receiving the data from the emulated BMC.

6. A method according to claim 1, further comprising:
retrieving policy data from a policy database associated with the processing system; and
configuring at least one of the emulated server blades in accordance with the policy data from the policy database.

7. A processing system comprising:
a storage medium;
a processor responsive to the storage medium;
on or more processing cores in the processor; and
instructions encoded in the storage medium, wherein the instructions, when executed by the processor, perform operations comprising:
using a first virtual machine (VM) in the processing system to emulate a first server blade;
using a second VM in the processing system to emulate a second server blade; and
using a virtual machine monitor (VMM) in the processing system to provide a communication channel to at least one of the emulated server blades to emulate an out-of-band communication channel for at least one of the emulated server blades;
using the VMM to emulate a baseboard management controller (BMC) for at least one of the emulated server blades;
receiving status data from one of the emulated BMCs via the emulated out-of-band communication channel, wherein the status data pertains to an operational status of the emulated server blade associated with the emulated BMC;
sending the status data from the VMM to server blade management software, wherein the server blade management software includes control logic to allow workload to be reallocated among physical server blades, but the server blade management software lacks support for reallocating workload among virtual server blades;
receiving, from the server blade management software, a packet requesting reallocation of workload from the first emulated server blade to the second emulated server blade; and in response to receiving the packet, using the emulated BMCs of the first and second emulated server blades to reallocated workload from the first VM to the second VM.

8. A processing system according to claim 7, wherein the operations performed by the instructions further comprise:
receiving, at the VMM, data pertaining to an operational status of one of the emulated server blades; and
forwarding the data pertaining to the operational status of the emulated server blade from the VMM to a remote data processing system.

9. A processing system according to claim 7, wherein the operations performed by the instructions further comprise:
using the VMM to emulate a chassis management module (CMM) to manage the emulated server blades.

10. A processing system according to claim 7, wherein the operations performed by the instructions further comprise:
automatically modifying an operational parameter of one or more of the emulated server blades, in response to receiving the status data from the emulated BMC.

11. A processing system according to claim 7, wherein the operations performed by the instructions further comprise:
retrieving policy data from a policy database associated with the processing system; and
configuring at least one of the emulated server blades in accordance with the policy data from the policy database.

12. An apparatus comprising:
a storage medium; and
instructions encoded in the storage medium, wherein the instructions, when executed by a processing system, perform operations comprising:
using a first virtual machine (VM) in the processing system to emulate a first server blade;
using a second VM in the processing system to emulate a second server blade; and
using a virtual machine monitor (VMM) in the processing system to provide a communication channel to at least one of the emulated server blades to emulate an out-of-band communication channel for at least one of the emulated server blades;
using the VMM to emulate a baseboard management controller (BMC) for at least one of the emulated server blades;
receiving status data from one of the emulated BMCs via the emulated out-of-band communication channel, wherein the status data pertains to an operational status of the emulated server blade associated with the emulated BMC;
sending the status data from the VMM to server blade management software, wherein the server blade management software includes control logic to allow workload to be reallocated among physical server blades, but the server blade management software lacks support for reallocating workload among virtual server blades;
receiving, from the server blade management software, packet requesting reallocation of workload from the emulated server blade to the second emulated server blade; and
in response to receiving the packet, using the emulated BMCs of the first and second emulated server blades to reallocated workload from the first VM to the second VM.

13. An apparatus according to claim 12, wherein the operations performed by the instructions further comprise:
receiving, at the VMM, data pertaining to an operational status of one of the emulated server blades; and
forwarding the data pertaining to the operational status of the emulated server blade from the VMM to a remote data processing system.

14. An apparatus according to claim 12, wherein the operations performed by the instructions further comprise:
using the VMM to emulate a chassis management module (CMM) to manage the emulated server blades.

15. A processing system according to claim 12, wherein the operations performed by the instructions further comprise:
automatically modifying an operational parameter of one or more of the emulated server blades, in response to receiving the status data from the emulated BMC.

16. An apparatus according to claim 12, wherein the operations performed by the instructions further comprise:
retrieving policy data from a policy database associated with the processing system; and
configuring at least one of the emulated server blades in accordance with the policy data from the policy database.

* * * * *